United States Patent [19]

Chen

[11] Patent Number: 5,173,099
[45] Date of Patent: Dec. 22, 1992

[54] PROCESS FOR MANUFACTURING ROAD WARNING DEVICE FOR DIVIDED DRIVEWAY

[76] Inventor: Hung-Chun Chen, Nan-San Road, Chang-He, Taiwan 235

[21] Appl. No.: 706,844

[22] Filed: May 29, 1991

[51] Int. Cl.$^5$ .......................... C03C 25/02; C03B 11/00
[52] U.S. Cl. ........................... 65/60.51; 65/66; 65/112; 65/122; 404/14; 404/94
[58] Field of Search ............... 65/60.51, 50, 53, 134, 65/112, 122, 66, 125; 404/14, 12, 94; 427/165, 180, 269

[56] References Cited

U.S. PATENT DOCUMENTS

| | | | |
|---|---|---|---|
| 273,371 | 3/1883 | Lindsley | 65/60.5 X |
| 447,568 | 6/1892 | Nichols et al. | 65/60.5 X |
| 1,615,886 | 2/1927 | Roirant | 65/125 |
| 1,617,220 | 2/1927 | Peiler | 65/125 X |
| 1,949,884 | 3/1934 | Slayter | 65/60.5 X |
| 2,838,408 | 6/1958 | Rindone | 404/14 X |
| 3,867,120 | 2/1975 | Schaefer | 404/12 X |
| 4,012,215 | 3/1977 | Schwab et al. | 65/66 |
| 4,102,663 | 7/1978 | Jung | 65/66 |
| 4,369,001 | 1/1983 | Eigenmann | 404/94 |
| 4,572,703 | 2/1986 | Moller | 404/94 |
| 4,634,310 | 1/1987 | Clarke | 404/15 |
| 4,753,548 | 6/1988 | Forrer | 404/15 |

*Primary Examiner*—Robert L. Lindsay
*Attorney, Agent, or Firm*—Bacon & Thomas

[57] ABSTRACT

The present invention pertains to a process for manufacturing a road warning device for a divided driveway, expecially a process for manufacturing a warning device in different colors, in order to match the traffic signs, in such a way that one first presses a melting pulp of potash-glass to form a main body, then high pressure spray a tinfoil metal powder on the spherical surface of the warning device, trim the circumferences of the uncooled reflecting spheroid, remove the excess metal alloy powder, and finally spray a metal-oxide or metal-halide (e.g. silver oxide, plumbous oxide or gold sodium chloride etc.) either on the entire spherical or semi-spherical surface of the reflecting spheroid, in order to show different colors on the reflecting spheroid. According to the preferred embodiment of the invention, the main body of the warning device is in white color and the reflecting spheroid exposed on the ground can be manufactured in different colors by means of spraying diverse metal compounds on it in order to match the traffic signs as well as to intensify its condensing and reflection effects by means of the metal powder sprayed on the external surfaces of the main body of the warning device.

5 Claims, 3 Drawing Sheets

PROCESS FOR MANUFACTURING ROAD WARNING DEVICE FOR DIVIDED DRIVEWAY

BACKGROUND OF THE INVENTION

The present invention pertains to a process for manufacturing a warning device for a divided highway, especially a process for manufacturing a warning device in different colors in order to match the traffic signs.

At present two kinds of warning devices are available for paving on divided highways: one is a white warning device exclusively used on a freeway, another one is the grass green warning device of South African origin, suitable for using on a normal driveway. The essential disadvantages of either above appliances are as follows:

(1) The white warning device for freeway applications is made of acrylic plastic which reflects the light source directly by means of the toothed structure inside its main body. The reflection effect is poor, and its reflecting spheroid is flat, therefore, dust can readily adhere to its surface and may weaken its reflecting effect day after day;

(2) The grass green warning device for normal driveway application is of South African origin, there is no other supply source, therefore, its high price is not economical;

(3) So far there is no new manufacturing know-how to provide varying colors, thus it is impossible to match the colors of the road markings.

In view of these prior art problems, the present invention is thus created to use potash-glass as the raw material for manufacturing a warning device. After the glass is pressed to form a main body, a tinfoil metal-powder is high pressure sprayed on its spherical surface, then the reflecting spheroid on the top of the warning device will be trimmed to remove the excess metal powder. Finally, a metal-oxide (e.g. silver oxide, plumbous oxide or gold sodium chloride etc.) will be sprayed either on the whole spherical surface or a semispherical surface of the reflecting spheroid, in order to show different colors on the reflecting spheroid.

SUMMARY OF THE INVENTION

According to the invention, a potash-glass tube is inserted into a tank which is full of melting pulp of potash-glass so that the glass melting pulp will adhere on the glass tube, which is then pressed to form a main body. Then, at high pressure, a tinfoil metal-powder is sprayed on the spherical surface of the warning device, the circumferences of the uncooled reflecting spheroid are trimmed, and the excess metal alloy powder is removed. Finally, a metal-oxide or metal-halide (e.g. silver oxide, plumbous oxide or gold sodium chloride etc.) is sprayed either on the whole spherical surface of the reflecting spheroid, in order to show different colors on the reflecting spheroid, or to cover a semispherical surface with a tooling, then spray a metal-oxide or metal-halide so that a semispherical surface is in transparent potash-glass and the other semispherical surface is in a desired different color. After the warning device is buried on a road, the reflecting spheroid is exposed on the ground and the metal powder sprayed on the external spherical surface can intensify its condensing and reflection effects. Additionally, different colored warning devices can be constructed corresponding to the variation of the different colored divided driveways or roadways, and the reflecting spheroid with a semispherical surface in a transparent color and semispherical surface in another treated color can minimize the hazards to a vehicle driver.

Therefore, the main object of the present invention is to provide a process for manufacturing a road warning device for divided driveways using potash-glass as a raw material to reduce its production cost and the product can be mass produced and applied on a freeway and a normal driveway.

Another object of the present invention is to apply a high pressure method to fix a tin-foil metal powder on the surface of the main body of the warning device so that the warning device will have both condensing and reflecting effects, and the reflecting spheroid on top of the main body will not readily permit debris to adhere to it so as to achieve better warning effect.

A further object of the present invention is to provide a metal-oxide on the reflecting spherical surface of the top of the warning device to provide different colors in order to match the road markings of a driveway, wherein a conventional one is limited to a single color only.

A yet further object of the present invention is to cover a semispherical surface with a tooling, then spray a metal-oxide on the other semispherical surface so that a semispherical surface is formed in a transparent potash-glass (i.e., the original color) and the other semispherical surface is in a color which is chemically reacted between the potash-glass and metal-oxide. After burying the invented warning device in a road, the reflecting spheroid is exposed on the ground and the metal powder sprayed on the external spherical surface can intensify its condensing and reflection effects in order to avoid hazards for a vehicle driver at night.

The final object of the present invention is to enlarge the reflecting spheroid of the warning device in order to increase its surfaces of light reception, stress and reflection.

BRIEF DESCRIPTION OF THE DRAWING

The above-described and other objects, features and advantages of the present invention will be more apparent from the following description when taken in conjunction with the following drawings wherein.

DETAILED DESCRIPTION OF THE PREFERRED EMBODIMENTS

Figure 1:
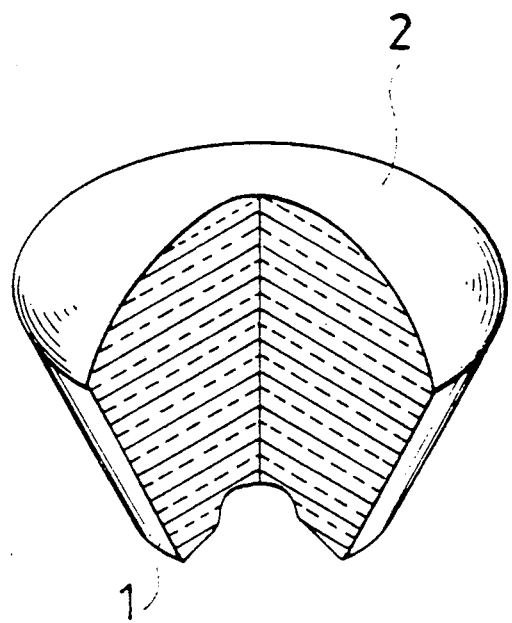
FIG. 1 is a perspective sectioned view of the present invention.
Figure 2:
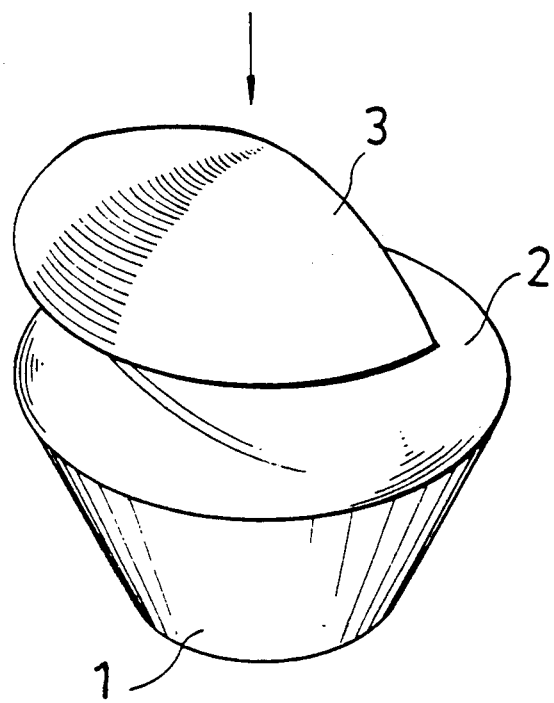
FIG. 2 is a schematic drawing showing a semispherical surface on the top of the invented warning device provided with a metal-oxide.

Description of item numbers:
1: potash-glass main body
2: potash-glass reflecting spheroid
3: arc tooling
4: polymer main body
5: polymer reflecting spheroid
51: transparent polymer reflecting spheroid
52: colored polymer reflecting spheroid
6 plastic injection machine 7 aluminum tin alloy sleeve The process for manufacturing the invented road warning device for divided driveway uses potash-glass as raw material. The potash-glass consists of fine sand, potassium carbonate and limestone, and its ingredients are potassium silicate, calcium silicate and silica which are featured by hard, difficult to melt and high chemical resistance properties. The steps include: Pour the potash-glass melting pulp into a reserve tank. First of all, insert a potash-glass tube into the tank which is full of melting pulp of potash-glass so that the glass melting pulp will adhere on the glass tube and subsequently pressed to form an umbrella-shaped warning device, which comprises of a main body (1) and a reflecting spheroid (2) (please refer to FIG. 1). The circumferences of the main body (1) are inclined at approximately 30°, and in the center of its bottom, main body (1) is provided with a concave hole. Then high pressure spray a tinfoil metal powder on the spherical surface of the main body (1), trim the circumferences of the uncooled reflecting spheroid (2) on top of the main body (1), remove the excess metal alloy powder on it, and finally spray a metal-oxide either on the whole spherical surface of the reflecting spheroid (2) or a portion thereof.

At this moment the potash-glass is still under a melting condition and makes the surfaces of the reflecting spheroid (2) react chemically with the sprayed metal-oxide and changed into different colors. For instance, when the reflecting spheroid (2) is sprayed with silver oxide ($Ag_2 O$), and/or plumbous oxide (Pb O) and/or gold sodium chloride ($NaCl . Au Cl_3$), it will show yellow, sprayed with copper oxide ($Cu_2O$) it will show red, sprayed with cobalt oxide (Co O) it will show blue, sprayed with ferrous oxide (Fe O) it will show green, sprayed with manganese dioxide ($MnO_2$), it will show purple (suitable for a runway), or when it is sprayed with feldspar powder or fluospar (calcium fluoride) powder, it will show beige etc. It is also contemplated to use an arc tooling (3) to cover the hemisphere of the reflecting spheroid (2) and spray the above mentioned metal oxide on the other hemisphere, so that a semispherical surface is in transparent potash-glass (original color) and the other semispherical surface is in a different color. The uncolored surface of the reflecting spheroid (2) of the warning device is transparent and will show white after it is radiated by a vehicle light and is suitable for application on a freeway; while the colored surface of the warning device is suitable for paving on a normal driveway for the convenience of driver's distinction and the warning device provided with a colored semispherical surface can reduce the hazards of a vehicle driver driving at night.

Figure 3:
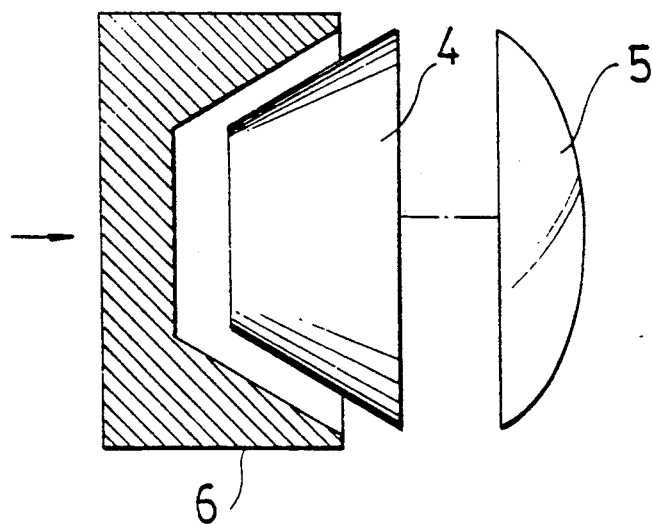
FIG. 3 is a schematic drawing of the structure of warning device made of polymeric material.
Figure 4:
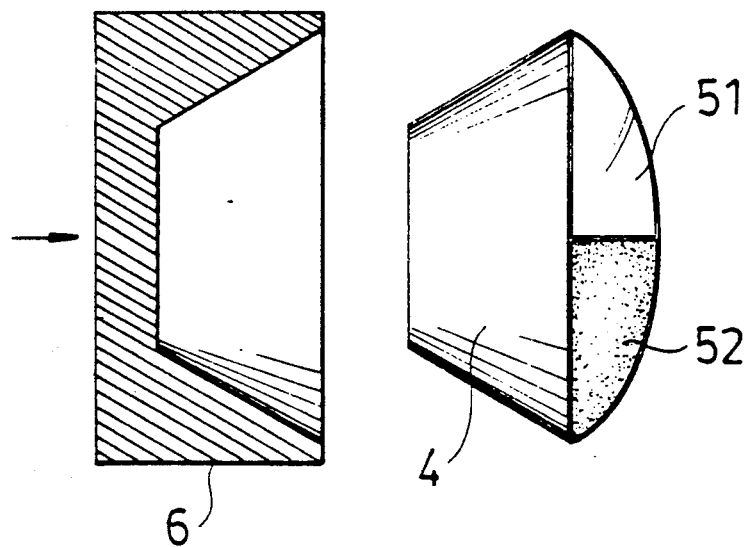
FIG. 4 is a schematic drawing of another structure of a warning device made of polymeric material.
Figure 5:
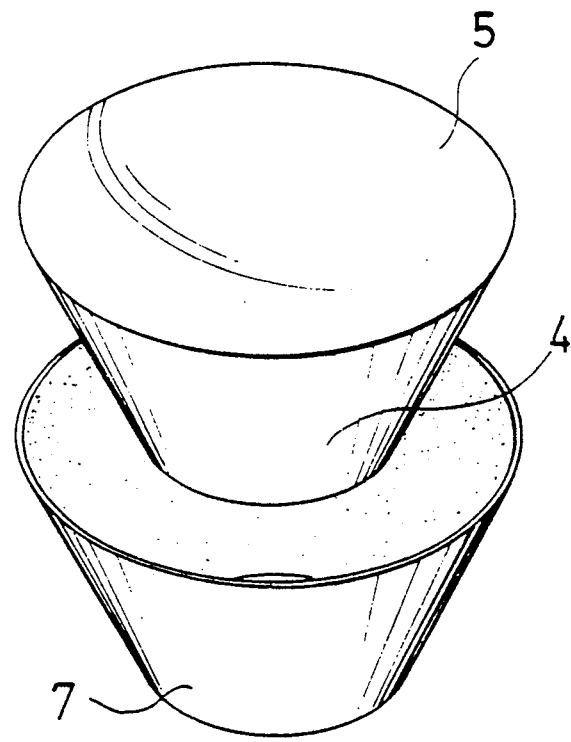
FIG. 5 is a schematic drawing showing the engagement of the main body of a warning device made of a polymeric material and an aluminum tin alloy.

The present invention can also use a polymeric material as the raw material. The steps in this embodiment include: First of all press the melting transparent or colored polymer pulp to form a hemispheric reflecting spheroid (5), then adhere the flat surface of the reflecting spheroid (5) on one end of a plastic injection machine (6), and inject the polymeric melting pulp from another end of the plastic injection machine to form a polymer main body (4) inside the plastic injection machine and to connect it with the polymer reflecting spheroid (5) under high temperature (see FIG. 3); or press the transparent or colored polymeric melting pulp respectively into a ¼ round polymer reflecting spheroids (51), (52) and connect these two pieces of polymer reflecting spheroids (51), (52) under high temperature condition into an integrated polymer reflecting spheroid (5) (please refer to FIG. 4), then according to the above mentioned procedures put the connected reflecting spheroid (5) on one end of the plastic injection machine (6), and inject transparent polymeric melting pulp from another end of the plastic injection machine (6) so that to form a polymer main body (4) inside the plastic injection machine (6) and to connect them under high temperature condition into an integrated polymer reflecting spheriod (5). The reflecting spheroid (5) of the warning device already assembled should be coated with a layer (thickness approx. 50 μm) of calcium hippurate solution and then give pressure at 180° C. molding temperature to make the intensity of the surface of the reflecting spheroid (5) reach 15.68N/25 mm. The calcium hippurate solution is mixed by 10% calcium hippurate with 90% of EVA. Finally use a pressed solid aluminum tin alloy sleeve (7) to engage the main body (4) of the warning device (please refer to FIG. 5), and use high pressure to fix the aluminum tin alloy sleeve (7) on the surface of the main body (4) so as to achieve the condensing and reflecting effect.

In general, as described above, the present invention is to provide a process for manufacturing a road warning device for divided driveway, using potash-glass or polymeric material as raw material, and to apply a metal-powder or color respectively on the main body and reflecting spherical surface, so that different colors can be provided on the reflecting spherical surface to match the color of the road marking, and with the aid of the metal powder adhered on the surface of the main body, it can intensify the condensing and reflecting effect of the warning device. It is not only economical to manufacture, but also can widely be applied on a freeway or a normal driveway to correspond with the color of road marking and is a technical improvement.

Although various specific embodiments of the invention have been described in detail, it should be understood that various changes and/or modifications can be made without departing from the spirit of the invention. In general, the invention is only intended to be limited by the scope of the following claims.

I claim:

1. A process for manufacturing a road warning device for a divided roadway comprising:
    pouring potash-glass into a tank;
    inserting a potash-glass tube into the tank such that at least some of the potash-glass in the tank will adhere to the tube;
    pressing the tube with the adhered potash-glass such that a spherical-shaped top surface is formed; and
    spraying a metal compound selected from the group consisting of a metal-oxide and metal-halide on at least a portion of the spherical-shaped top surface when the top surface is still in a softened condition such that the metal compound adheres to the top surface and chemically reacts with the potash-glass to alter the reflective color thereof.

2. A process for manufacturing a road warning device as claimed in claim 1, further comprising covering a portion of the spherical-shaped top surface with an arc tooling during spraying of the metal compound such that the spherical-shaped top surface has varying reflective colors.

3. A process for manufacturing a road warning device as claimed in claim 1, wherein said metal compound is a metal oxide selected from the group consisting of silver oxide, plumbous oxide, copper oxide, cobalt oxide, ferrous oxide, manganese dioxide and feldspar powder.

4. A process for manufacturing a road warning device as claimed in claim 1, wherein said metal compound is a metal-halide selected from the group consisting of gold sodium chloride and fluospar powder.

5. A process for manufacturing a road warning device as claimed in claim 1, further comprising spraying the road warning device, while in a softened condition prior to spraying the metal compound, with a metal powder such that a main body portion of the warning device will be wrapped in the metal powder in order to strengthen the warning device.

* * * * *